US012435818B2

(12) United States Patent
Maury et al.

(10) Patent No.: US 12,435,818 B2
(45) Date of Patent: Oct. 7, 2025

(54) RETAINER CLIP ASSEMBLY

(71) Applicant: Aptiv Technologies AG, Schaffhausen (CH)

(72) Inventors: Marissa Maury, Hubbard, OH (US); Wyatt Lipinsky, Youngstown, OH (US); Andrew Bohan, Tallmadge, OH (US); David Peterson, Aurora, OH (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/712,515

(22) Filed: Jun. 2, 2022

(65) Prior Publication Data

US 2023/0213119 A1 Jul. 6, 2023

Related U.S. Application Data

(60) Provisional application No. 63/296,673, filed on Jan. 5, 2022.

(51) Int. Cl.
*F16L 3/10* (2006.01)
*F16B 2/06* (2006.01)
*F16L 3/22* (2006.01)
*F16L 3/237* (2006.01)

(52) U.S. Cl.
CPC ............. *F16L 3/1091* (2013.01); *F16B 2/06* (2013.01); *F16L 3/221* (2013.01); *F16L 3/237* (2013.01)

(58) Field of Classification Search
CPC .......... F16L 3/1091; F16L 3/221; F16L 3/237; F16L 3/2235; F16L 55/035; F16B 2/06
See application file for complete search history.

(56) References Cited

U.S. PATENT DOCUMENTS

| 3,421,187 | A | * | 1/1969 | Ryder | F16L 3/2235 D8/356 |
| 3,843,083 | A | * | 10/1974 | Angibaud | B62J 6/03 403/90 |
| 3,856,244 | A | * | 12/1974 | Menshen | F16L 3/237 248/68.1 |
| 3,906,592 | A | * | 9/1975 | Sakasegawa | H02G 3/32 248/68.1 |
| 4,089,087 | A | * | 5/1978 | Heitman | F16L 3/237 24/329 |
| 4,669,156 | A | * | 6/1987 | Guido | F16L 3/2235 24/336 |
| 4,707,906 | A | * | 11/1987 | Posey | F16L 3/223 24/339 |

(Continued)

OTHER PUBLICATIONS

Hellermann Tyton Drawing No. 11-0740-005-CSU, Rev. 03 (HellermannTyton North America), released Mar. 7, 2012.

*Primary Examiner* — Jason W San
*Assistant Examiner* — Rowland Do
(74) *Attorney, Agent, or Firm* — Billion & Armitage

(57) ABSTRACT

A retainer clip assembly includes a first retainer clip and a second retainer clip that, when attached to the first retainer clip, defines a first aperture and a second aperture with an opening therebetween. The opening between the first and second apertures provides thermal communication between first and second elongate elements, for example an electrical bus bar and a coolant conduit providing a heat sink for the bus bar, when they are secured within the first and second apertures.

13 Claims, 14 Drawing Sheets

(56) References Cited

U.S. PATENT DOCUMENTS

| | | | | |
|---|---|---|---|---|
| 4,799,641 A * | 1/1989 | Koreski | F16L 3/2235 | 248/68.1 |
| 4,881,705 A * | 11/1989 | Kraus | F16L 3/237 | 248/68.1 |
| 4,913,386 A * | 4/1990 | Sugiyama | F16L 3/12 | 248/68.1 |
| 5,033,701 A * | 7/1991 | Kraus | F16L 3/2235 | 248/74.1 |
| 5,060,810 A * | 10/1991 | Jones | A47F 7/0035 | 248/68.1 |
| 5,115,542 A * | 5/1992 | Gehres | F16L 3/2235 | 24/339 |
| 5,172,877 A * | 12/1992 | Hattori | F16L 3/237 | 24/535 |
| 5,184,794 A * | 2/1993 | Saito | F16L 3/13 | 248/74.1 |
| 5,257,768 A * | 11/1993 | Juenemann | F16L 55/035 | 248/68.1 |
| 5,535,969 A * | 7/1996 | Duffy, Jr. | F16L 3/237 | 248/68.1 |
| 5,613,655 A * | 3/1997 | Marion | F16L 3/2235 | 24/339 |
| 5,653,411 A * | 8/1997 | Picco | F16L 3/2235 | 24/339 |
| 5,794,897 A * | 8/1998 | Jobin | H02G 7/053 | 248/68.1 |
| 6,308,921 B1 * | 10/2001 | Borzucki | F16L 3/237 | 248/68.1 |
| 7,007,900 B2 * | 3/2006 | Goodwin | H02G 7/053 | 248/74.1 |
| 7,553,279 B1 * | 6/2009 | Phillips | F16B 2/185 | 248/74.1 |
| 8,025,643 B2 * | 9/2011 | Bierman | A61M 25/02 | 604/174 |
| D676,314 S * | 2/2013 | Cude | D8/396 | |
| 8,708,289 B2 * | 4/2014 | Allenbach | F16L 3/2235 | 248/68.1 |
| 8,708,290 B2 * | 4/2014 | Franta | B65H 57/06 | 248/219.3 |
| 9,416,896 B1 * | 8/2016 | Kato | F16L 3/222 | |
| 9,551,440 B2 * | 1/2017 | Gutgold | H05K 7/1491 | |
| D795,051 S * | 8/2017 | Papafagos | D8/396 | |
| 10,655,374 B2 * | 5/2020 | Fukumoto | F16L 3/237 | |
| 10,864,868 B2 * | 12/2020 | Ko | B60R 16/023 | |
| 2005/0116122 A1 * | 6/2005 | Nakanishi | F16L 3/223 | 248/68.1 |
| 2010/0025272 A1 * | 2/2010 | Stau | F16L 55/035 | 206/349 |
| 2012/0014767 A1 * | 1/2012 | Pearson | F16B 37/0842 | 411/511 |
| 2012/0153095 A1 * | 6/2012 | Child | F16L 55/035 | 248/68.1 |
| 2013/0240684 A1 * | 9/2013 | Meyers | H02G 3/32 | 248/74.1 |
| 2014/0091182 A1 * | 4/2014 | Fukumoto | F16L 3/2235 | 248/68.1 |
| 2016/0076689 A1 * | 3/2016 | Kato | F16L 3/1091 | 248/636 |
| 2023/0042090 A1 * | 2/2023 | Zhu | F16L 3/1091 | |
| 2024/0035592 A1 * | 2/2024 | Farnetti | F16B 7/0433 | |

* cited by examiner

RETAINER CLIP ASSEMBLY

CROSS-REFERENCE TO RELATED APPLICATION

This application claims benefit of priority to U.S. Application No. 63/296,673 filed on Jan. 5, 2022, the entire disclosure of which is hereby incorporated by reference.

TECHNICAL FIELD

This disclosure is directed to a retainer clip assembly configured to retain to elongate articles in thermal contact with one another.

BACKGROUND

The automotive industry uses routing aids to hold when multiple components together as they are routed in the same fashion. Clips and channels have become standard for providing routing aids because they provide adequate spacing and keep the components organized.

SUMMARY

According to one or more aspects of the present disclosure, a retainer clip assembly includes a first retainer clip and a second retainer clip that, when attached to the first retainer clip, defines a first aperture and a second aperture with an opening therebetween. The opening provides thermal communication between first and second elongate elements when they are secured within the first and second apertures.

In one or more embodiments of the retainer clip assembly according to the previous paragraph, the opening provides physical contact between the first and second elongate elements.

In one or more embodiments of the retainer clip assembly according to any one of the previous paragraphs, the first aperture has a generally rectangular cross-section and the second aperture has a generally round cross-section.

In one or more embodiments of the retainer clip assembly according to any one of the previous paragraphs, the first and second retainer clips are identical to one another.

In one or more embodiments of the retainer clip assembly according to any one of the previous paragraphs, the first and second retainer clips are formed of an electrically insulative material selected from a list consisting of urethane methacrylate (UMA), polyimide (PA), and polybutylene terephthalate (PBT) materials.

In one or more embodiments of the retainer clip assembly according to any one of the previous paragraphs, the first and second retainer clips are formed using an additive manufacturing process.

According to one or more aspects of the present disclosure, an electrical assembly includes the retainer clip assembly according to any one of the previous paragraphs, an electrical bus bar disposed within the first aperture of the retainer clip assembly, and a heat sink disposed within the second aperture of the retainer clip assembly.

In one or more embodiments of the retainer clip assembly according to some of the previous paragraphs, the opening is a first opening and the second retainer clip, when attached to the first retainer clip, defines a third aperture and a fourth aperture with a second opening therebetween. The second opening provides thermal communication between third and fourth elongate elements when they are secured within the third and fourth apertures.

In one or more embodiments of the retainer clip assembly according to one or more of the two previous paragraphs, the previous paragraph, the first and third apertures have a first identical shape, the second and fourth apertures have a second identical shape, and the first and third apertures have different shapes than the second and fourth apertures and wherein the third apertures has a generally rectangular cross-section and the fourth aperture has a generally round cross-section.

In one or more embodiments of the retainer clip assembly according to one or more of the two previous paragraphs, the first opening and second aperture are laterally and longitudinally offset from the second opening and the fourth aperture.

In one or more embodiments of the retainer clip assembly according to one or more of the three previous paragraphs, the first and third elongate elements are electrical bus bars and the second and fourth elements are heat sinks.

According to one or more aspects of the present disclosure, an electrical assembly includes the retainer clip assembly according to one or more of the four previous paragraphs, first and second electrical bus bars disposed within the first and third apertures of the retainer clip assembly; and first and second heat sinks disposed within the second and fourth apertures of the retainer clip assembly.

In one or more embodiments of the electrical assembly according to the previous paragraph, the first heat sink is in physical and thermal contact with the first electrical bus bar through the first opening in the retainer clip assembly. The second heat sink is in physical and thermal contact with the second electrical bus bar through the second opening in the retainer clip assembly.

In one or more embodiments of the electrical assembly according to one or more of the two previous paragraphs, the first and second electrical bus bars have a generally rectangular cross-section and the first and second heat sinks have a generally round cross-section.

According to one or more aspects of the present disclosure, a retainer clip configured to be attached to another retainer clip to form a first aperture and a second aperture with a first opening therebetween and form a third aperture and a fourth aperture with a second opening therebetween includes a base defining a first rectangular slot located adjacent to a first arc-shaped wall and a second rectangular slot adjacent to a second arc-shaped wall.

In one or more embodiments of the electrical assembly according to the previous paragraph an outer side wall of the first rectangular slot has a height equal to an outer side wall of the second rectangular slot. An inner sidewall of the first rectangular slot has a height greater than the outer side wall of the first rectangular slot. An inner sidewall of the second rectangular slot has a height less than the height of the outer side wall of the second rectangular slot.

In one or more embodiments of the electrical assembly according to any one of the previous paragraphs the first arc-shaped wall has an arc length greater than an arc length of the second arc-shaped wall.

In one or more embodiments of the electrical assembly according to any one of the previous paragraphs the base defines a straight wall that is arranged tangent to the second arc-shaped wall.

In one or more embodiments of the electrical assembly according to any one of the previous paragraphs each end of the base defines a flexible locking arm next to a rigid locking tab.

In one or more embodiments of the electrical assembly according to any one of the previous paragraphs the locking arm is on the same side of the locking tab as viewed from each end of the base.

BRIEF DESCRIPTION OF THE DRAWINGS

The present invention will now be described, by way of example with reference to the accompanying drawings, in which.

DETAILED DESCRIPTION

Figure 11:
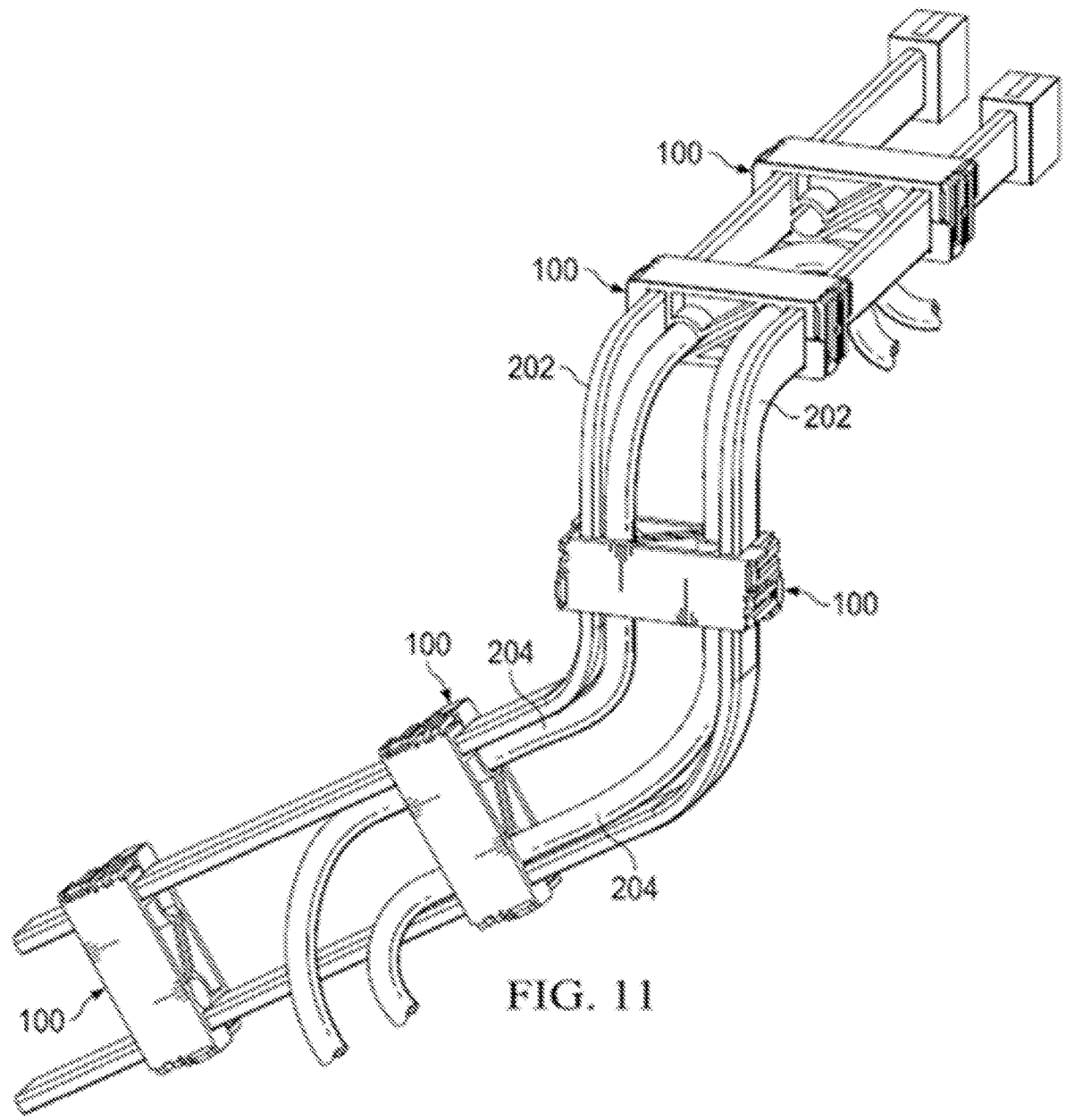
FIG. 11 illustrates a perspective view of bus bars and coolant lines secured by a plurality of the retainer clip assemblies of FIG. 1 according to some embodiments.

A non-limiting example of a retainer clip assembly, hereinafter referred to as the assembly 100 is illustrated in FIGS. 1 to 5. This particular example of the assembly 100 is configured to retain two electrical bus bars 202 in two generally rectangular apertures 102 formed in the assembly and two heat sinks 204 in two generally round apertures 104 formed in the assembly as shown in FIG. 11. In the illustrated example, the heat sinks 204 are coolant conduits. The assembly 100 is formed of an electrically insulative material, in order to electrically isolate the electrical bus bars 202 from one another. The assembly 100 is configured such that each of the electrical bus bars 202 in the rectangular apertures 102 are in physical and thermal contact with the heat sinks 204 in the round apertures 104 through a first opening 106 between the rectangular aperture 102 and the round aperture 104. This thermal contact between the bus bars 202 and the heat sinks 204 allows the heat sinks 204 to transfer heat from the electrical bus bars 202 that is caused by resistive losses while the electrical bus bars 202 are conducting electrical current. The assembly 100 may further include a thermally conductive paste (not shown) between the electrical bus bars 202 and the heat sinks 204 to enhance heat transfer from the electrical bus bars 202 to the heat sinks 204. The width of the assembly 100 is selected to provide a more controlled surface area contact between the electrical bus bars 202 and the heat sinks 204.

The assembly 100 includes two retainer clips 108 as shown in FIGS. 6-10. Each of the retainer clips 108 is identical to the other and is interchangeable. The retainer clips 108 may be formed of a urethane methacrylate (UMA) material, e.g., UMA 90 distributed by Carbon, Inc. of Redwood City, California, using an automated additive manufacturing process, e.g., 3D printing, stereolithography, digital light processing, fused deposition modeling, fused filament fabrication, selective laser sintering, selecting heat sintering, multi-jet modeling, multi-jet fusion, electronic beam melting, and/or laminated object manufacturing. Alternatively, the retainer clips 108 may be formed of a polyamide (PA) or polybutylene terephthalate (PBT) material using a conventional injection molding process.

Figure 1:
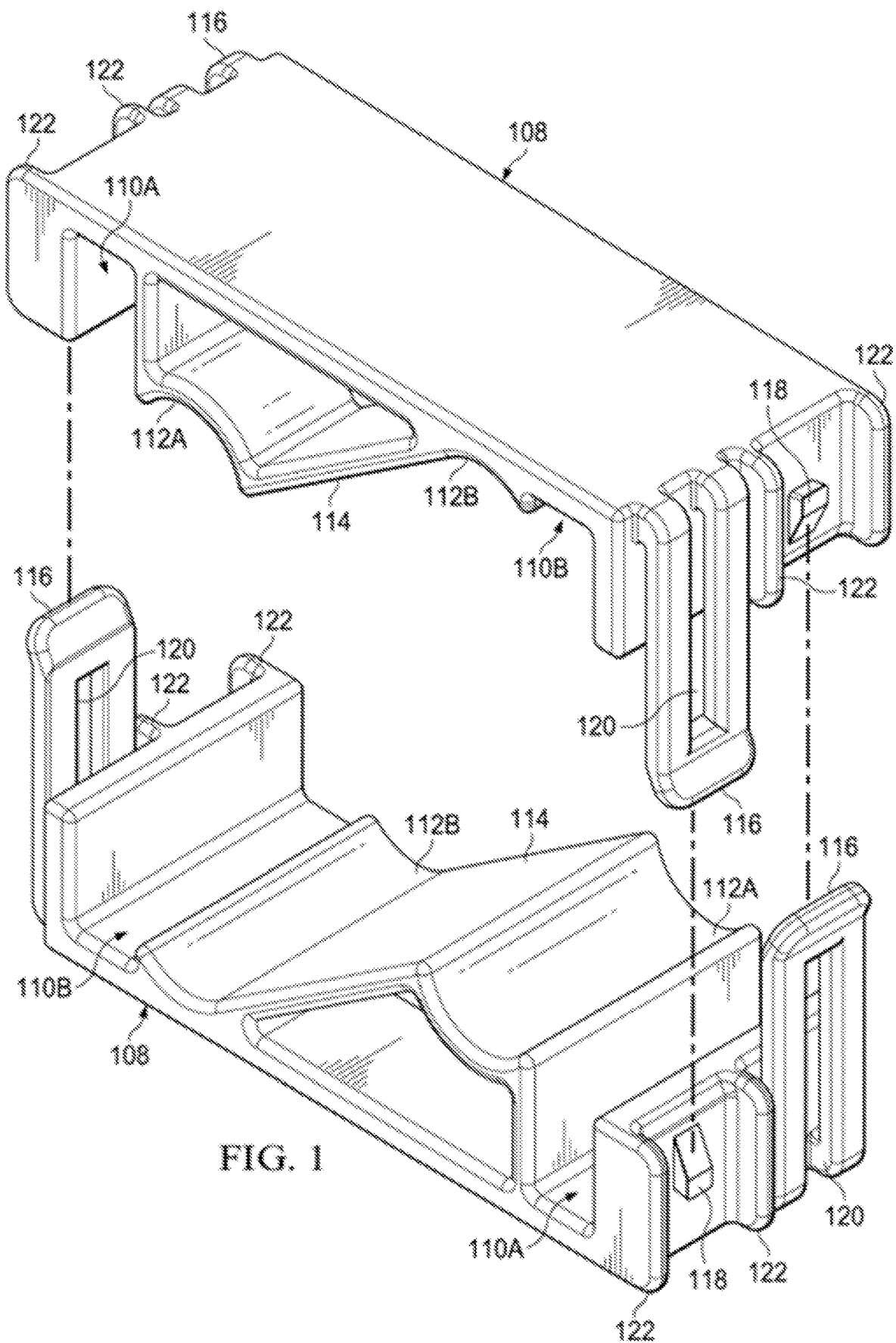
FIG. 1 illustrates an exploded view of a retainer clip assembly according to some embodiments.
Figure 2:
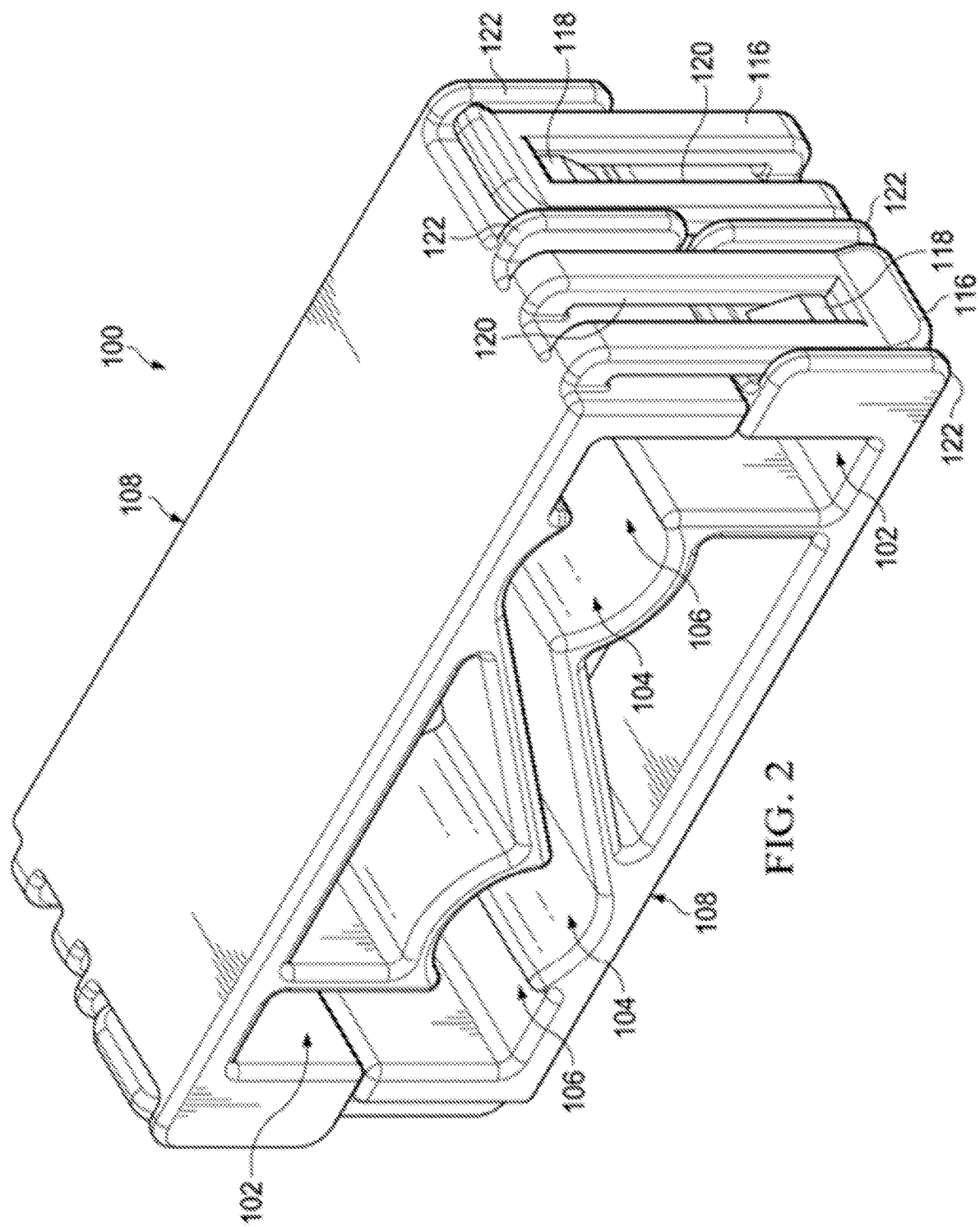
FIG. 2 illustrates a perspective view of the retainer clip assembly of FIG. 1 according to some embodiments.
Figure 3:
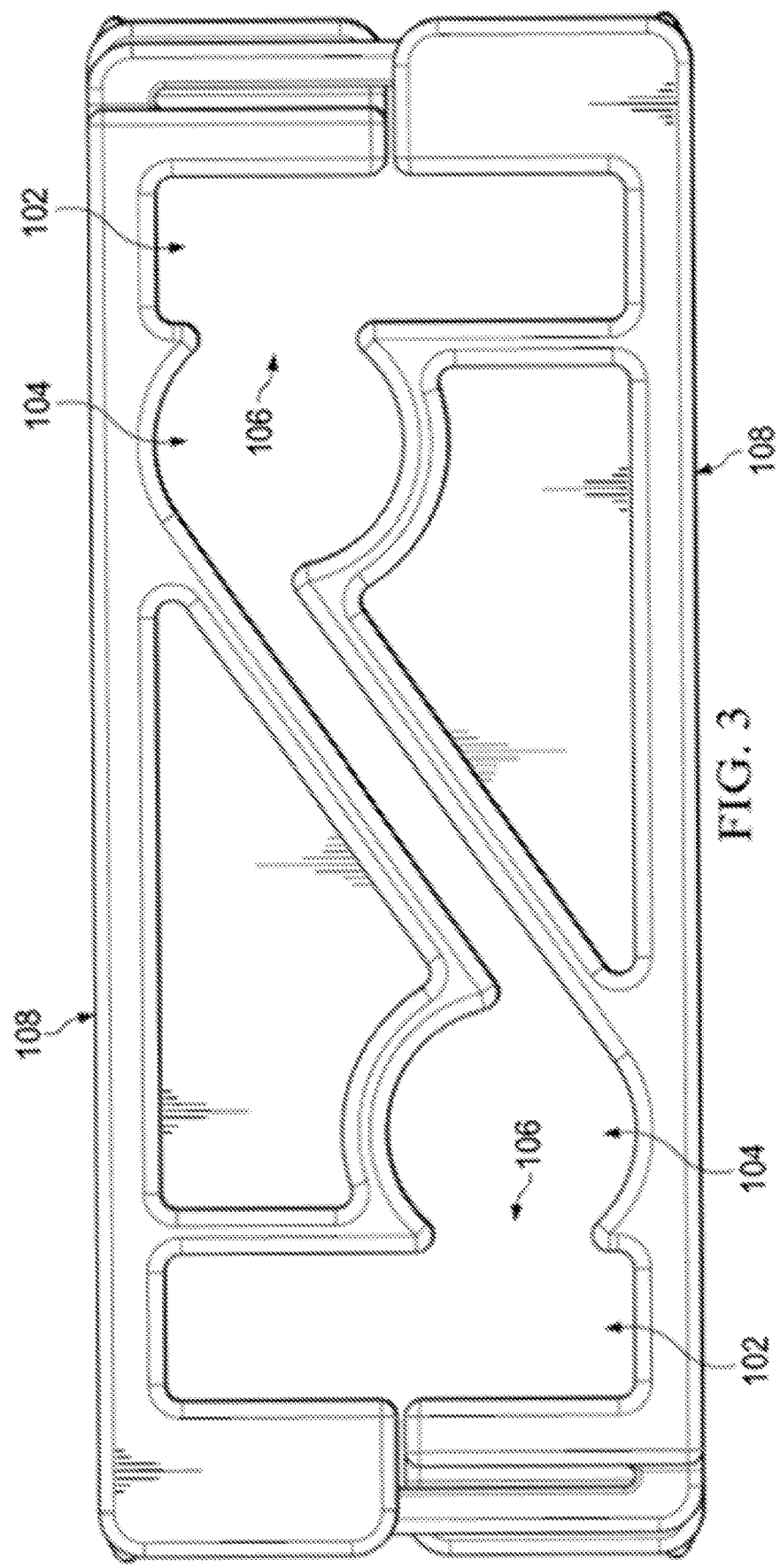
FIG. 3 illustrates a front/rear view of the retainer clip assembly of FIG. 1 according to some embodiments.
Figure 4:
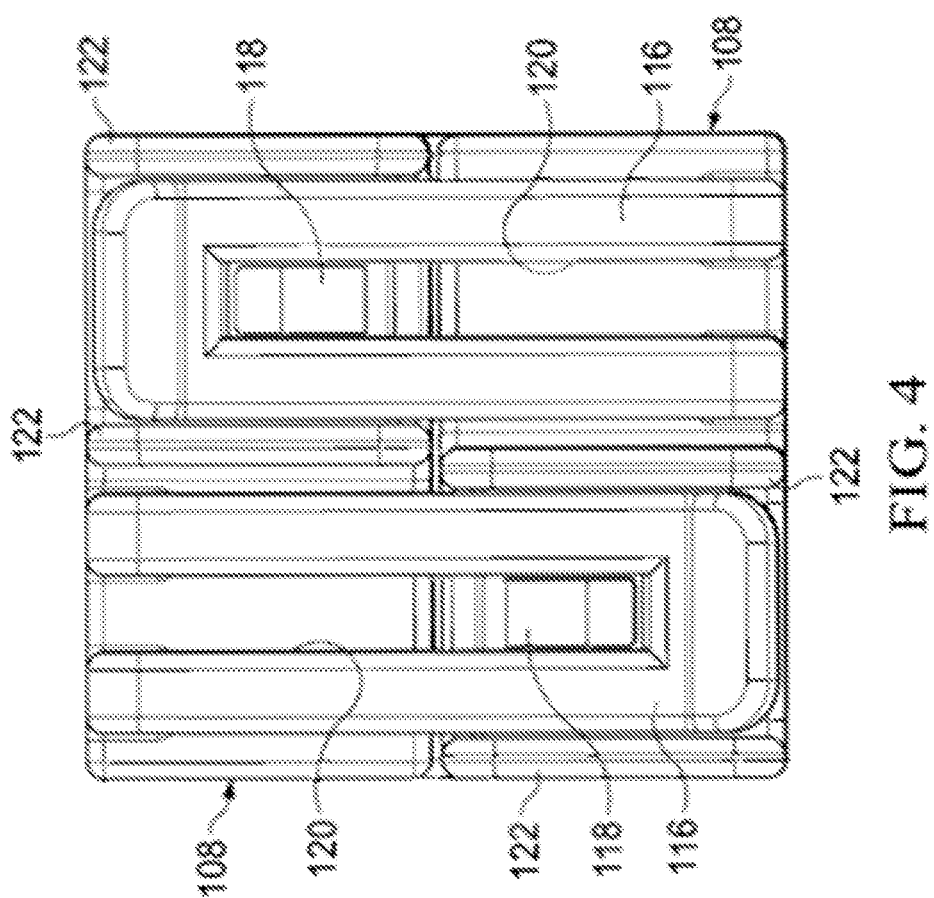
FIG. 4 illustrates a right/left side view of the retainer clip assembly of FIG. 1 according to some embodiments.
Figure 5:
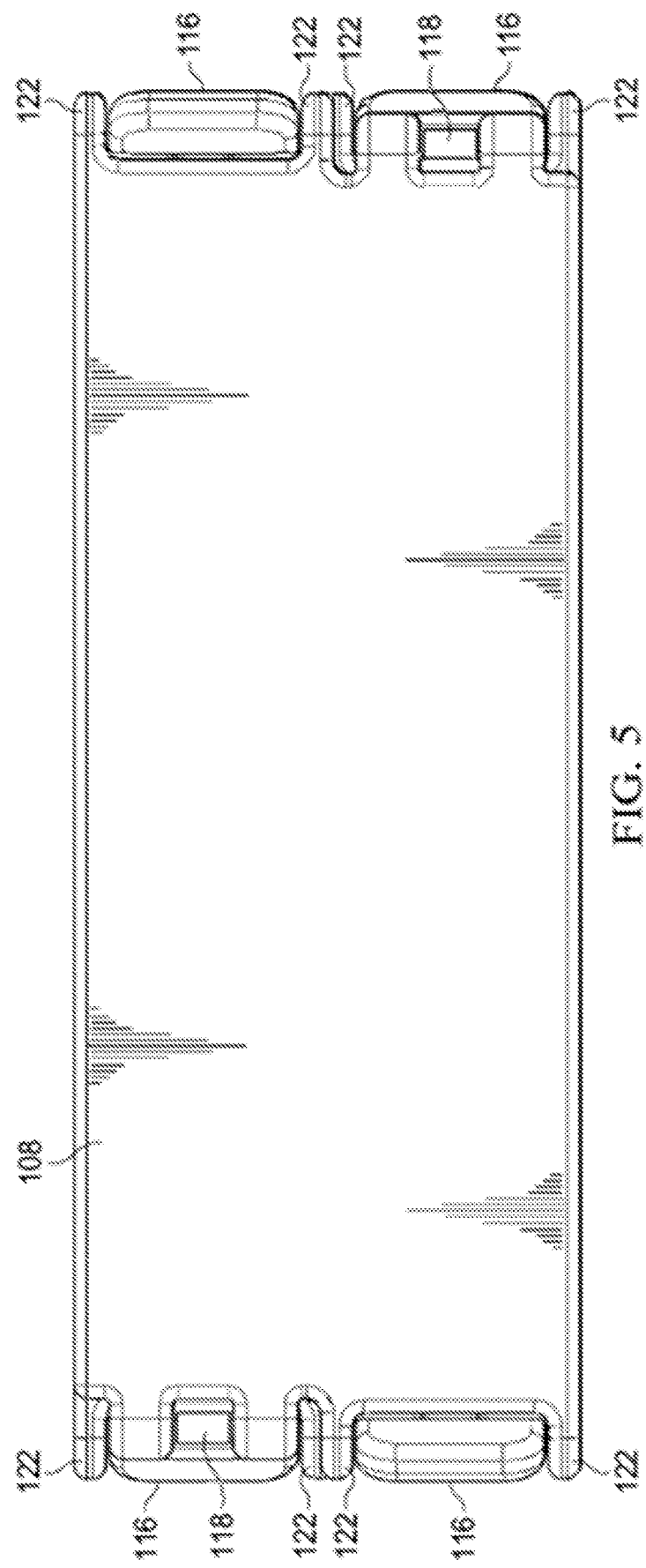
FIG. 5 illustrates a top/bottom view of the retainer clip assembly of FIG. 1 according to some embodiments.
Figure 6:
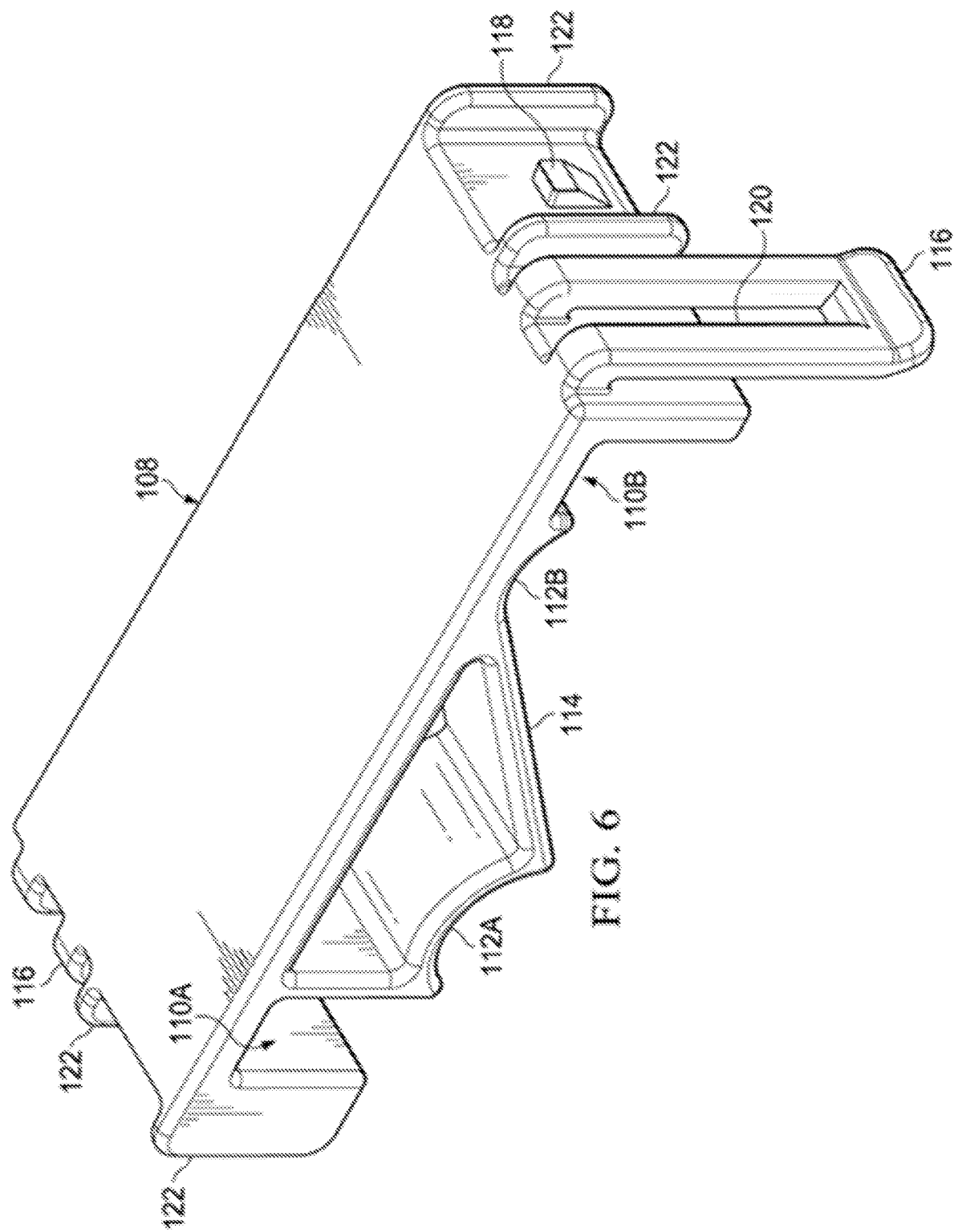
FIG. 6 illustrates a perspective view of a retainer clip of the retainer clip assembly of FIG. 1 according to some embodiments.

As shown in FIG. 6, each of the retainer clips 108 include a pair of rectangular slots 110A, 110B that form the two rectangular apertures 102 and a pair of arc-shaped walls 112A, 112B that form the round apertures 104 when the retainer clips 108 are attached to each other to form the assembly 100, as shown in FIG. 2. The first rectangular slot 110A is located adjacent to a first arc-shaped wall 112A. The second rectangular slot 110B is located adjacent to the second arc-shaped wall 112B. The opening 106 is formed between the second rectangular slot 110B and the second arc-shaped wall 112B which allows the thermal contact between the bus bar 202 and the heat sink 204. The clip 108 also has a straight wall 114 that is arranged tangent to the second arc-shaped wall 112B.

Figure 7:
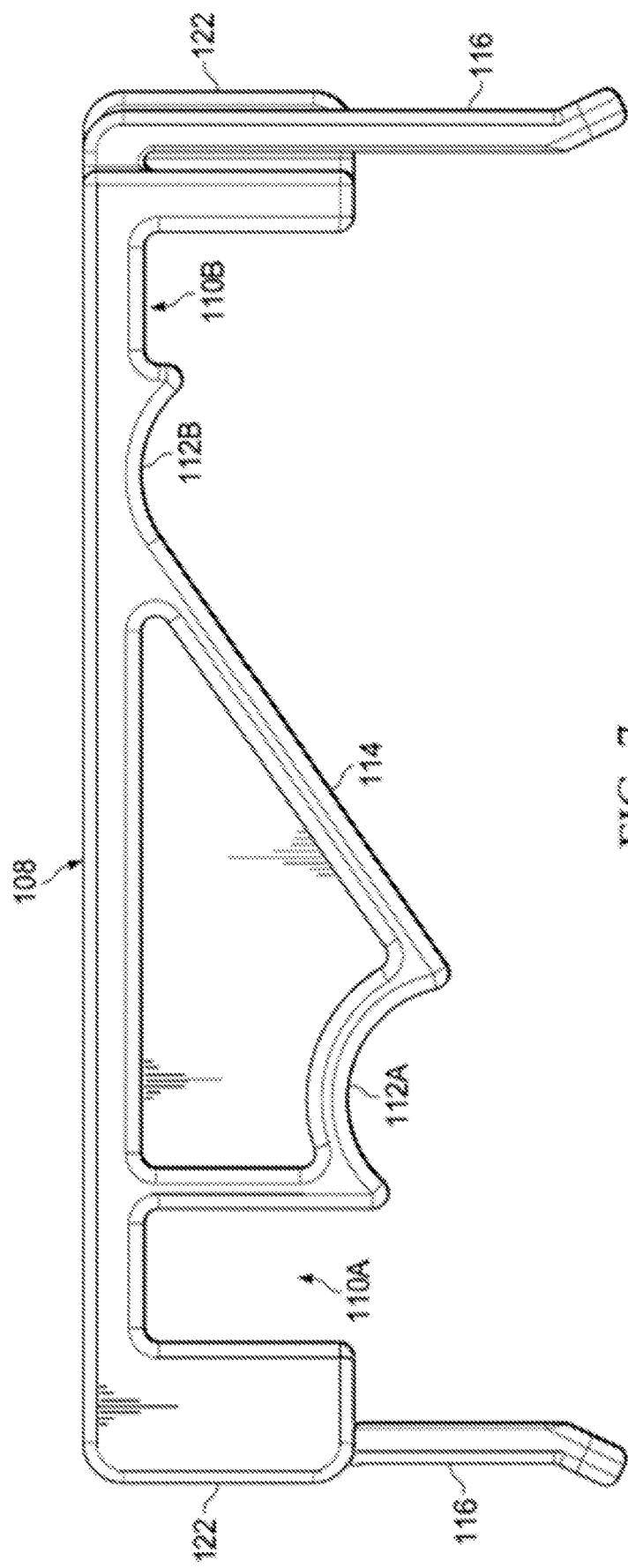
FIG. 7 illustrates a front/rear view of the retainer clip of FIG. 6 according to some embodiments.
Figure 8:
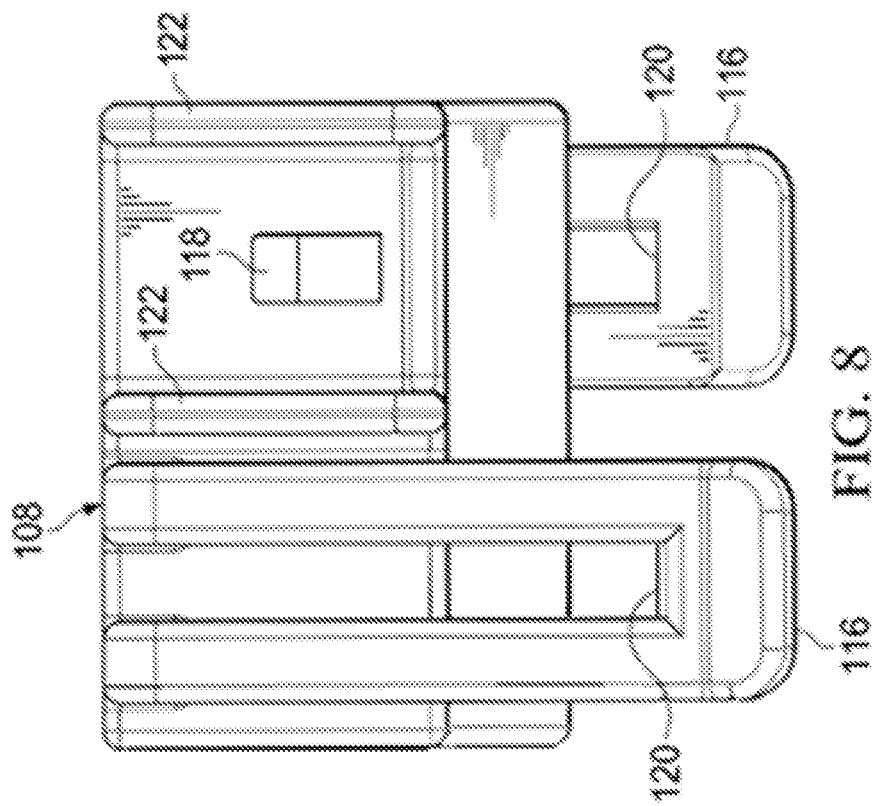
FIG. 8 illustrates a right/left side view of the retainer clip of FIG. 6 according to some embodiments.
Figure 9:
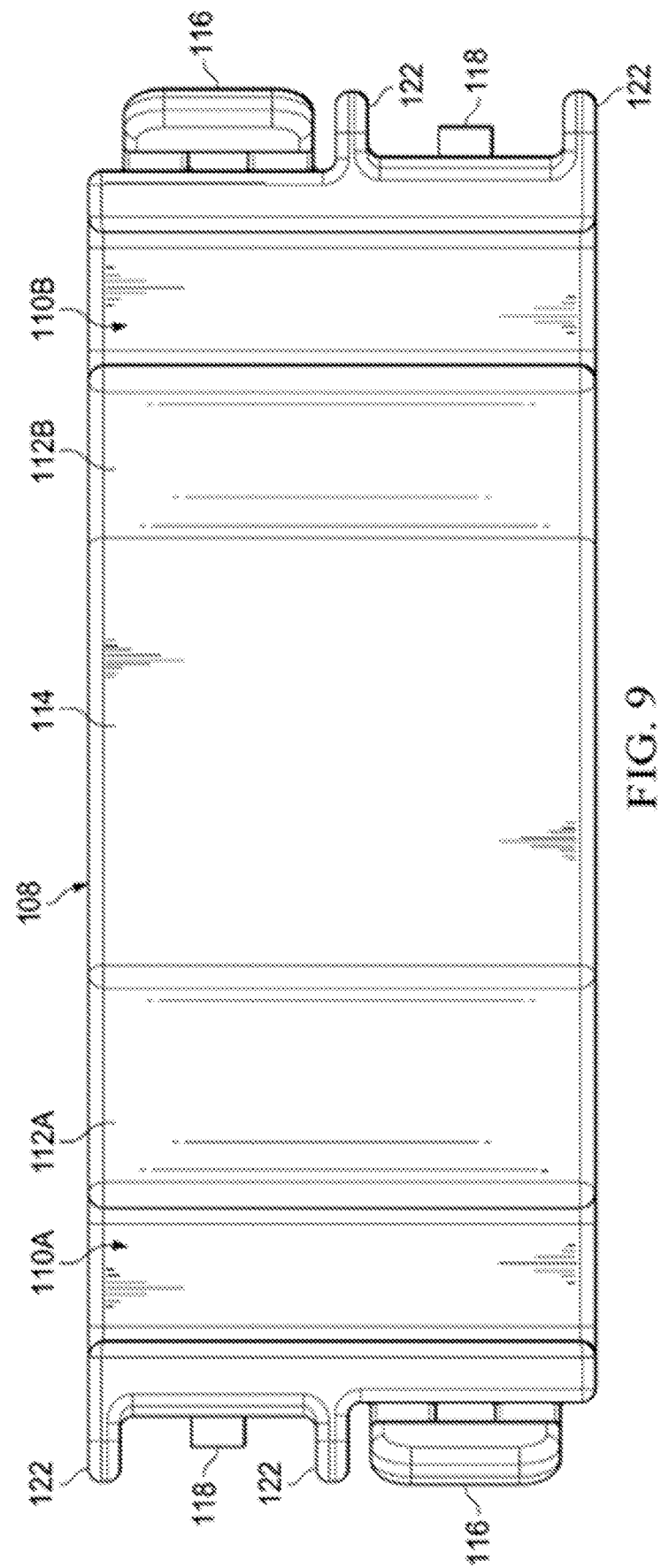
FIG. 9 illustrates a bottom view of the retainer clip of FIG. 7 according to some embodiments.
Figure 10:
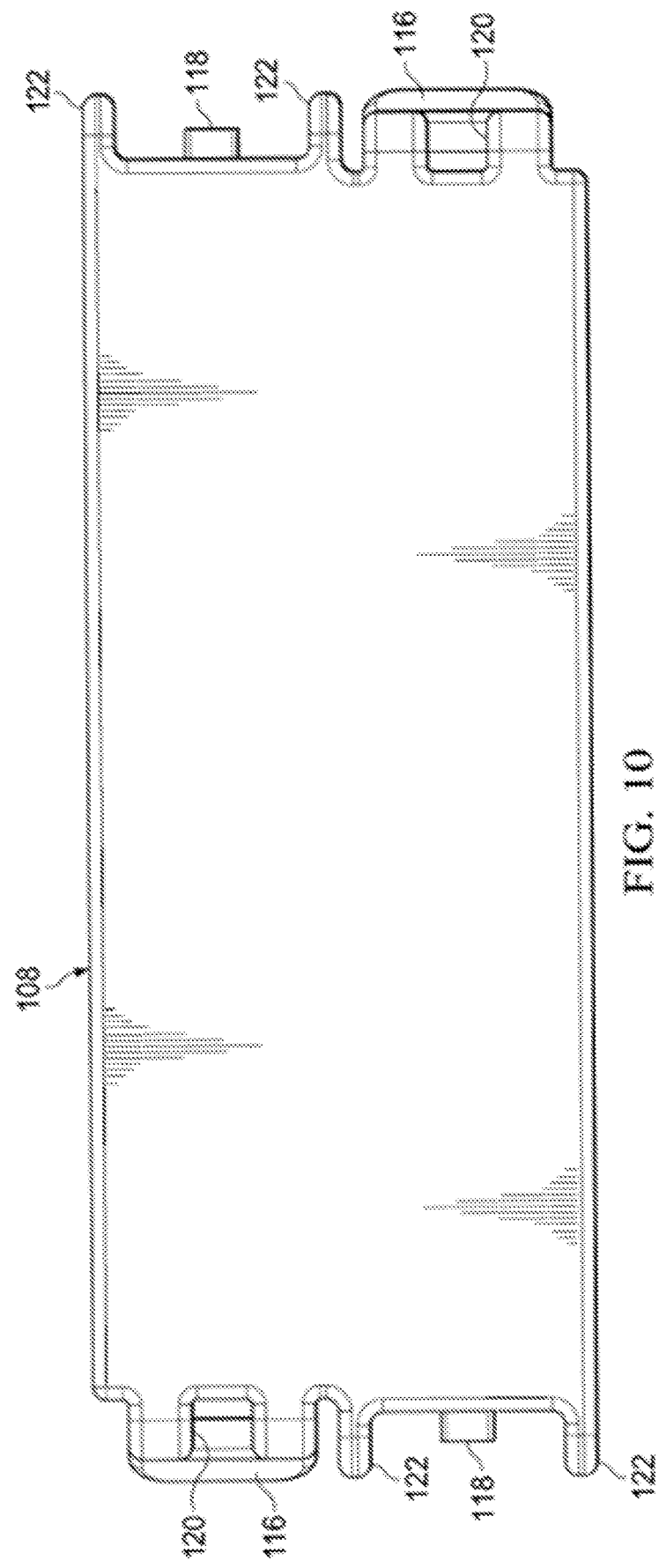
FIG. 10 illustrates a top view of the retainer clip of FIG. 7 according to some embodiments.

The retainer clips 108 are secured to each other by two flexible arms 116 and lock tabs 118 shown in FIG. 7 that extend from each end of the retainer clips 108. The arms 116 on a first retainer clip 108 are laterally offset from each other so that they do not interfere with the arms 116 of a second retainer clip 108 when they are joined to form the assembly 100 as shown in FIG. 2. The arms 116 define slots 120. The lock tabs 118 are received within the slots 120 when the first and second retainer clips 108 are joined to form the assembly 100 and cooperate to keep the retainer clips 108 secured to one another. The arms 116 of the first retainer clip 108 are received between guiding walls 122 in the second retainer clip 108 to ensure that the lock tabs 118 are properly received within the slots 120 on the arms 116.

While the illustrated example of the electrical assembly in FIG. 11 shows the retaining clip assembly used to hold uninsulated rectangular bus bars against round heat sinks, this same retaining clip assembly could also be used to hold uninsulated round wires in physical and thermal contact with rectangular coolant conduits or heat sinks. Other embodiments of the retaining clip assembly may be envisioned that are configured to hold bus bars and heat sinks having shapes other than round or rectangular in physical and thermal contact.

FIGS. 12 through 16 illustrate another non-limiting example of a retainer clip assembly, hereinafter referred to as the assembly 300. This particular example of the assembly 300 is configured to retain an electrical bus bar in a generally rectangular aperture 302 formed in the assembly 300 and a heat sink in a generally round aperture 304 formed in the assembly 300.

Figure 12:
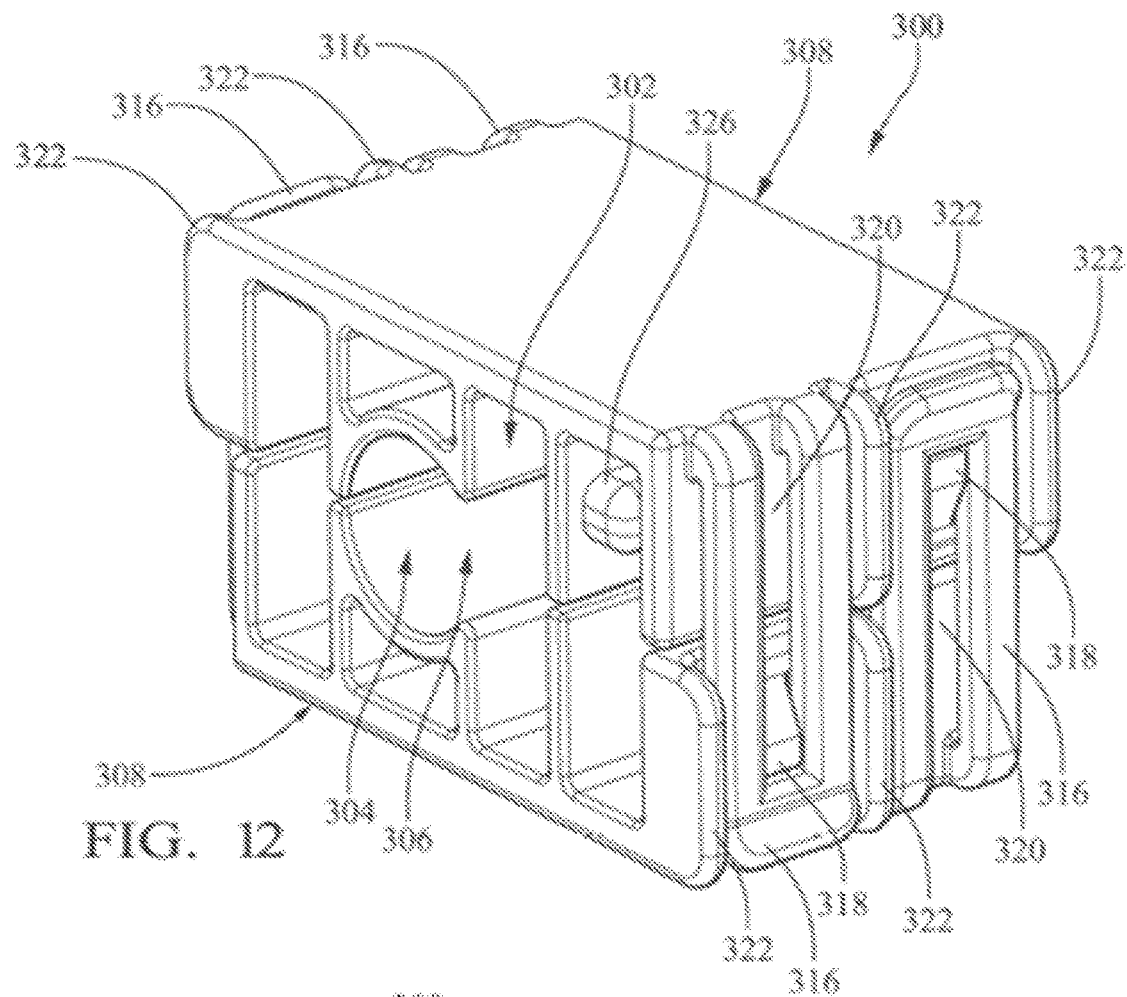
FIG. 12 illustrates a perspective view of a retainer clip assembly according to some embodiments.
Figure 13:
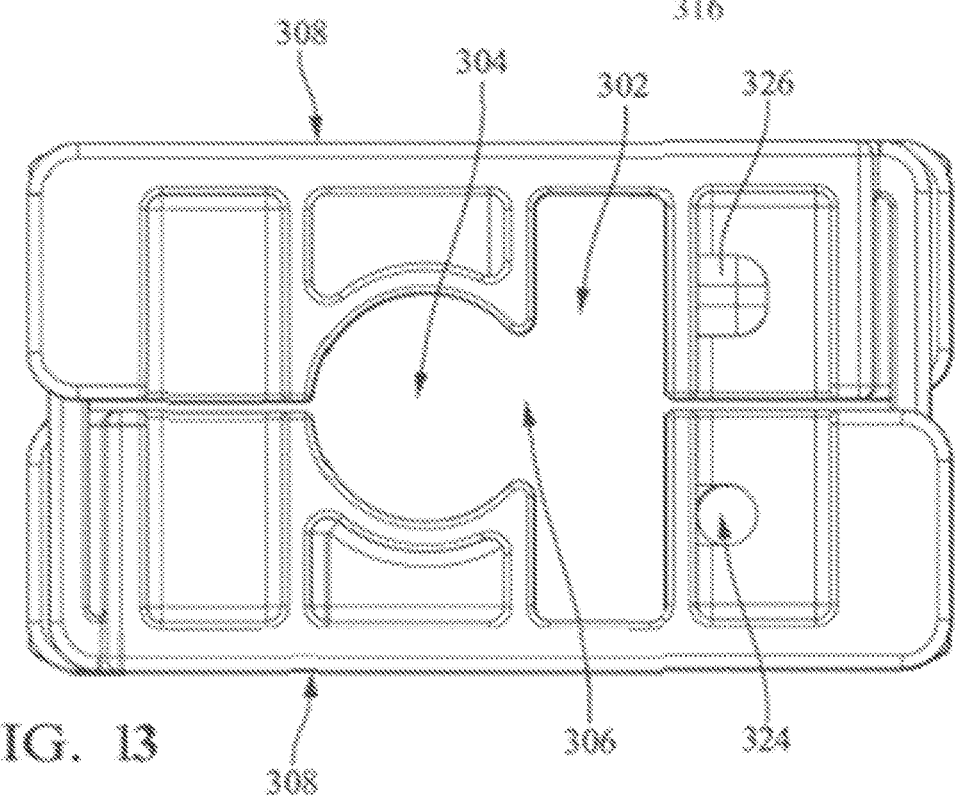
FIG. 13 illustrates a front view of the retainer clip assembly of FIG. 12 according to some embodiments.

The assembly 300 includes two retainer clips 308 as shown in FIGS. 12 and 13. Each of the retainer clips 308 is identical to the other and is interchangeable. The retainer clips 308 may be formed of a urethane methacrylate (UMA) material, e.g., UMA 90 distributed by Carbon, Inc. of Redwood City, California, using an automated additive manufacturing process, e.g., 3D printing, stereolithography, digital light processing, fused deposition modeling, fused filament fabrication, selective laser sintering, selecting heat sintering, multi-jet modeling, multi-jet fusion, electronic beam melting, and/or laminated object manufacturing. Alternatively, the retainer clips 308 may be formed of a polyamide (PA) or polybutylene terephthalate (PBT) material using a conventional injection molding process.

Figure 14:
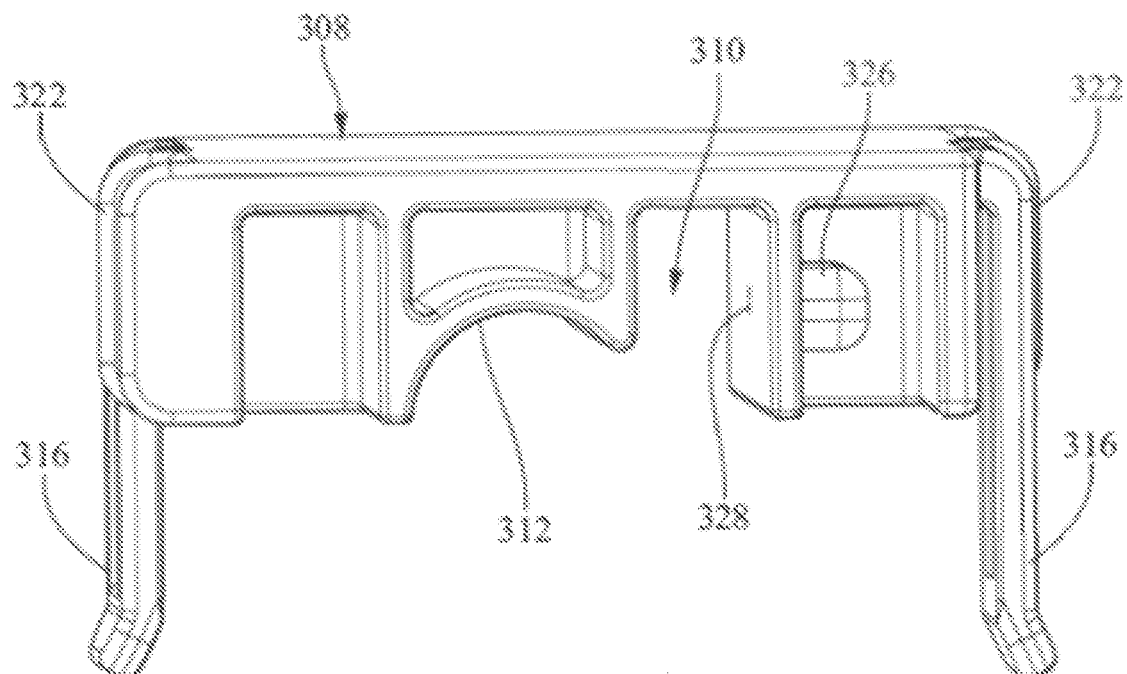
FIG. 14 illustrates a perspective view of a retainer clip of the retainer clip assembly of FIG. 12 according to some embodiments.
Figure 15:
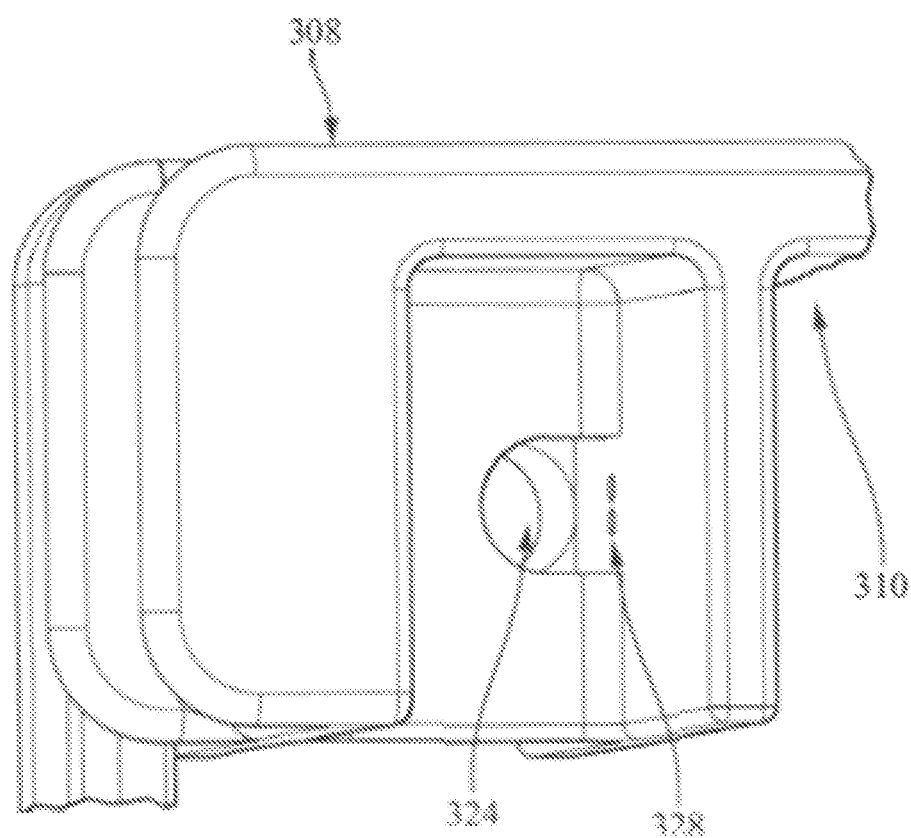
FIG. 15 illustrates a close up view of the retainer clip of FIG. 14 according to some embodiments.

As shown in FIG. 14, each of the retainer clips 308 include a rectangular slot 310 that forms the rectangular aperture 302 and an arc-shaped wall 312 that forms the round aperture 304 when the retainer clips 308 are attached to each other to form the assembly 300, as shown in FIG. 12.

The retainer clips 308 are secured to each other by two flexible arms 316 and lock tabs 318 shown in FIG. 12 that extend from each end of the retainer clips 308. The arms 316 on a first retainer clip 308 are laterally offset from each other so that they do not interfere with the arms 316 of a second retainer clip 308 when they are joined to form the assembly 300 as shown in FIG. 12. The arms 316 define slots 320. The lock tabs 318 are received within the slots 320 when the first and second retainer clips 308 are joined to form the assembly 300 and cooperate to keep the retainer clips 308 secured to one another. The arms 316 of the first retainer clip 308 are received between guiding walls 322 in the second retainer clip 308 to ensure that the lock tabs 318 are properly received within the slots 320 on the arms 316.

The retainer clip 308 may incorporate a thermal sensor (not shown) that is disposed within a cavity 324 in a thermal sensor holder 326, as shown in FIG. 13, that is formed in a wall of the retainer clip 308 near the rectangular slot 310 in order to monitor the temperature of a bus bar or other rectangular elongate object in the rectangular slot 310. The retainer clip may further define a passage 328 between the cavity 324 and the rectangular slot 310 to improve thermal response of the thermal sensor. The temperature sensor may be a thermistor, thermocouple, or another other type of electrical temperature sensing device. Temperature data collected by the temperature sensor may be used to modulate a coolant flow through a coolant conduit disposed in the round aperture 304 and/or reduce/eliminate electrical current conducted through a bus bar disposed in the round aperture 302 in order to prevent overheating of the bus bar.

Other embodiments of the assembly 100 may be envisioned in which a thermal sensor holder, cavity, and passage are similarly incorporated the retainer clips 108.

Figure 16:
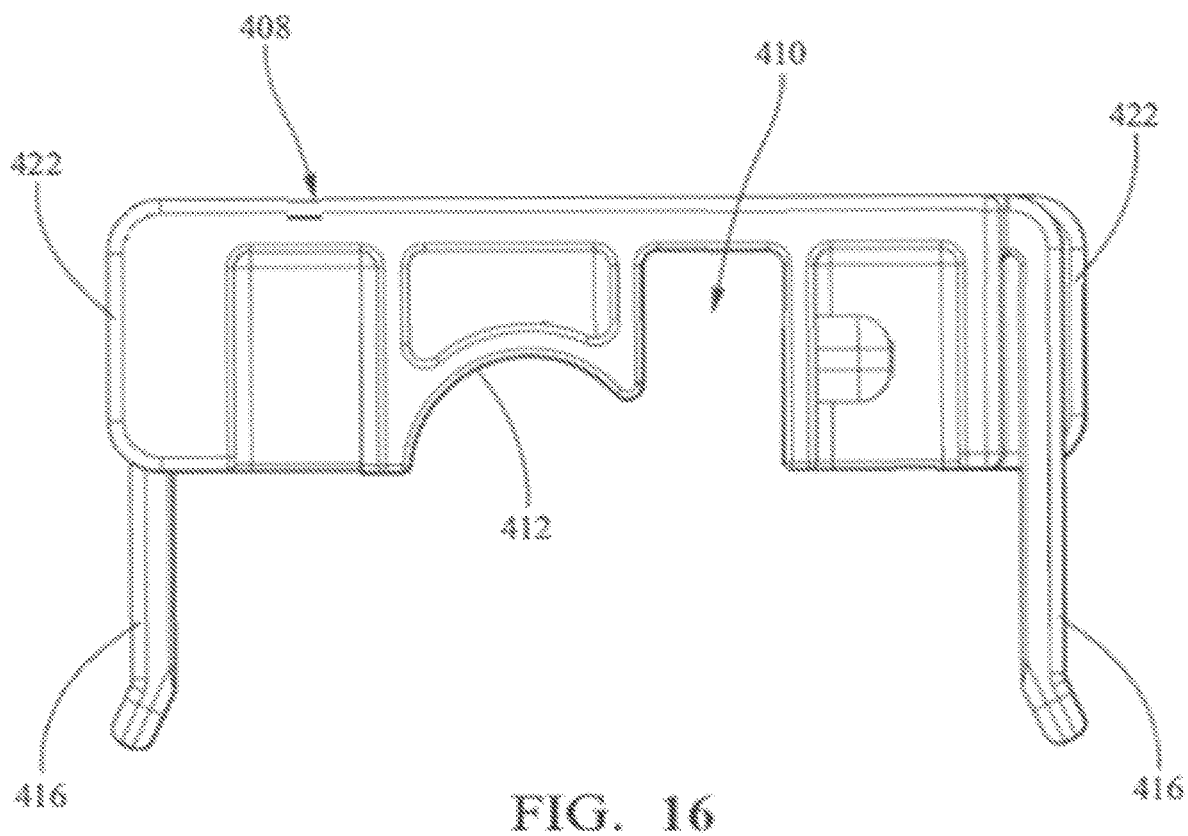
FIG. 16 illustrates a front view of a retainer clip of FIG. 14 according to some embodiments.

FIG. 16 illustrates another example of a retainer clip 408 that is not configured to include a thermal sensor that may be used to form a retainer clip assembly similar to assembly 300.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical assembly, comprising:
   a first retainer clip;
   a second retainer clip that, when attached to the first retainer clip, defines a first aperture and a second aperture with an opening therebetween;
   an electrical bus bar disposed within the first aperture of the retainer clip assembly; and
   a heat sink disposed within the second aperture of the retainer clip assembly, wherein the opening provides thermal communication between the bus bar and the heat sink secured within the first and second apertures.

2. The electrical assembly according to claim 1, wherein the opening is a first opening, wherein the second retainer clip, when attached to the first retainer clip, defines a third aperture and a fourth aperture with a second opening therebetween, and wherein the second opening provides thermal communication between third and fourth elongate elements when they are secured within the third and fourth apertures.

3. The electrical assembly according to claim 2, wherein the first and third apertures have a first identical shape, the second and fourth apertures have a second identical shape, and the first and third apertures have different shapes than the second and fourth apertures and wherein the third aperture has a generally rectangular cross-section and the fourth aperture has a generally round cross-section.

4. The electrical assembly according to claim 2, wherein the first opening and second aperture are laterally and longitudinally offset from the second opening and the fourth aperture.

5. The electrical assembly according to claim 2, wherein the first and third elongate elements are electrical bus bars and the second and fourth elements are heat sinks.

6. An electrical assembly, comprising:

the electrical assembly of claim 2;

first and second electrical bus bars disposed within the first and third apertures of the retainer clip assembly; and first and second heat sinks disposed within the second and fourth apertures of the retainer clip assembly.

7. The electrical assembly according to claim 6, wherein the first heat sink is in physical and thermal contact with the first electrical bus bar though the first opening in the retainer clip assembly and wherein the second heat sink is in physical and thermal contact with the second electrical bus bar though the second opening in the retainer clip assembly.

8. The electrical assembly according to claim 6, wherein the first and second electrical bus bars have a generally rectangular cross-section and wherein the first and second heat sinks have a generally round cross-section.

9. An electrical assembly, comprising:

a first retainer clip;

a second retainer clip that, when attached to the first retainer clip, defines a first aperture and a second aperture with an opening therebetween;

a heat sink disposed within the first aperture of the retainer clip assembly; and an electrical bus bar disposed within the second aperture of the retainer clip assembly, wherein the opening provides thermal communication between the bus bar and the heat sink secured within the first and second apertures.

10. The electrical assembly according to claim 9, wherein the opening is a first opening, wherein the second retainer clip, when attached to the first retainer clip, defines a third aperture and a fourth aperture with a second opening therebetween, and wherein the second opening provides thermal communication between third and fourth elongate elements when they are secured within the third and fourth apertures.

11. An electrical assembly, comprising:

the electrical assembly of claim 10;

first and second heat sinks disposed within the first and third apertures of the retainer clip assembly; and first and second electrical bus bars disposed within the second and fourth apertures of the retainer clip assembly.

12. The electrical assembly according to claim 11, wherein the first heat sink is in physical and thermal contact with the first electrical bus bar though the first opening in the retainer clip assembly and wherein the second heat sink is in physical and thermal contact with the second electrical bus bar though the second opening in the retainer clip assembly.

13. The electrical assembly according to claim 11, wherein the first and second electrical bus bars have a generally rectangular cross-section and wherein the first and second heat sinks have a generally round cross-section.

\* \* \* \* \*

UNITED STATES PATENT AND TRADEMARK OFFICE
CERTIFICATE OF CORRECTION

PATENT NO. : 12,435,818 B2
APPLICATION NO. : 17/712515
DATED : October 7, 2025
INVENTOR(S) : Marissa Maury et al.

It is certified that error appears in the above-identified patent and that said Letters Patent is hereby corrected as shown below:

In the Claims

Colum 7, Claim 7, "The electrical assembly according to claim 6, wherein the first heat sink is in physical and thermal contact with the first electrical bus bar though the first opening in the retainer clip assembly and wherein the second heat sink is in physical and thermal contact with the second electrical bus bar though the second opening in the retainer clip assembly.."
Should read --The electrical assembly according to claim 6, wherein the first heat sink is in physical and thermal contact with the first electrical bus bar though the first opening in the retainer clip assembly and wherein the second heat sink is in physical and thermal contact with the second electrical bus bar through the second opening in the retainer clip assembly.--

Colum 8, Claim 12, "The electrical assembly according to claim 11, wherein the first heat sink is in physical and thermal contact with the first electrical bus bar though the first opening in the retainer clip assembly and wherein the second heat sink is in physical and thermal contact with the second electrical bus bar though the second opening in the retainer clip assembly."
Should read --The electrical assembly according to claim 11, wherein the first heat sink is in physical and thermal contact with the first electrical bus bar through the first opening in the retainer clip assembly and wherein the second heat sink is in physical and thermal contact with the second electrical bus bar through the second opening in the retainer clip assembly.--

Signed and Sealed this
Twenty-seventh Day of January, 2026

John A. Squires
*Director of the United States Patent and Trademark Office*